May 29, 1934.  C. E. LEONARD  1,960,443
SHOCK ABSORBER
Filed June 22, 1931
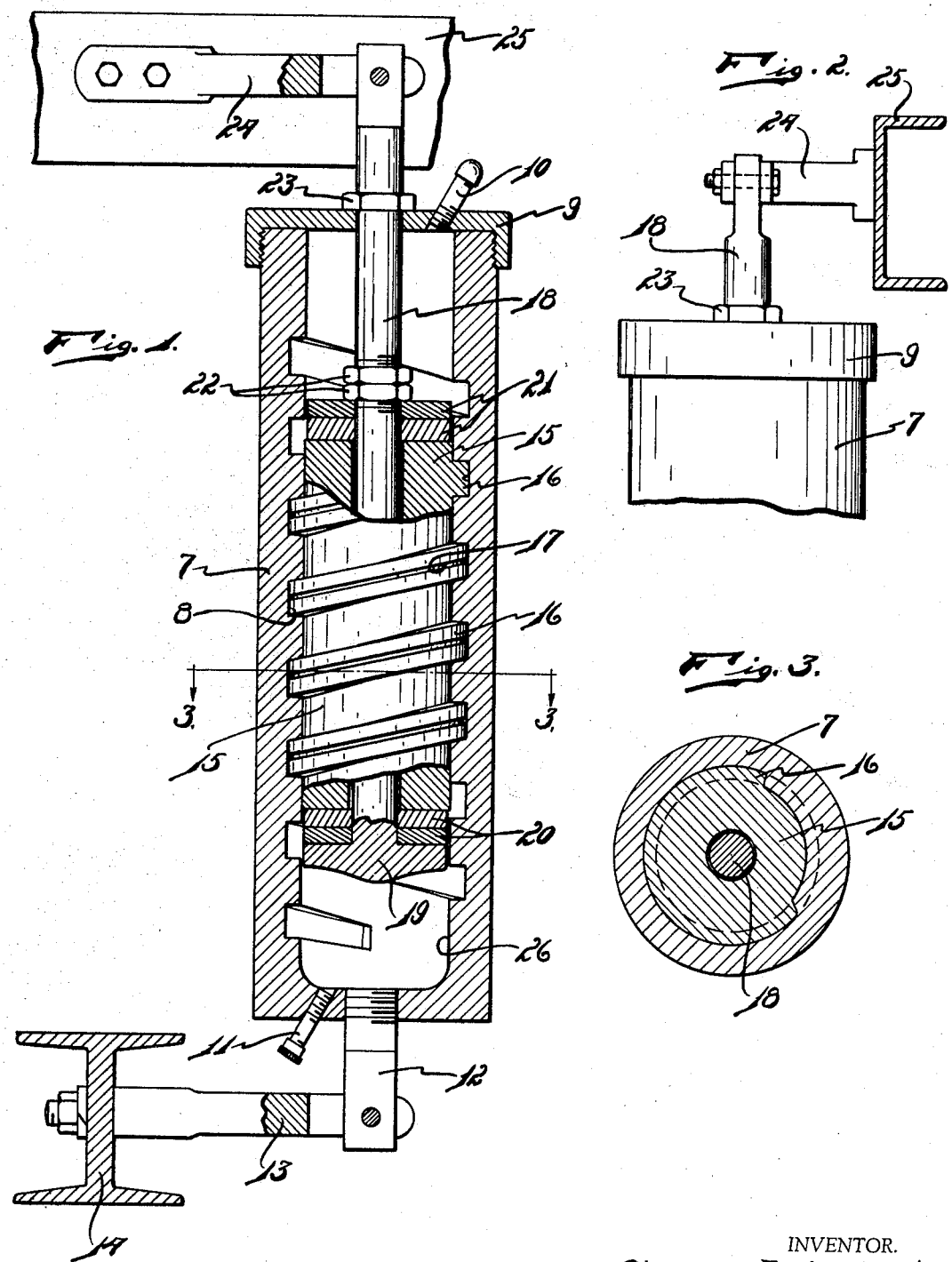
INVENTOR.
CLARENCE E. LEONARD
BY
ATTORNEY.

Patented May 29, 1934

1,960,443

UNITED STATES PATENT OFFICE 1,960,443

SHOCK ABSORBER

Clarence E. Leonard, Grosse Pointe, Mich.

Application June 22, 1931, Serial No. 545,966

1 Claim. (Cl. 188—129)

My invention relates to a new and useful improvement in a shock absorber adapted for attachment on vehicles and similar articles in which the approach and withdrawal of relative parts is permitted and on which it is desired to avoid sudden approach or withdrawal.

It is an object of the present invention to provide a shock absorber in which a longitudinal thrust may be delivered to a rotatable body, longitudinal movement of which is permitted only upon rotation and as the rotation proceeds.

It is another object of the present invention to provide in a shock absorber a construction in which the thrust is delivered to a body movable longitudinally only upon rotation, so constructed and arranged as to be compact, durable, highly efficient in use, and economical to manufacture.

Other objects will appear hereinafter.

The invention consists in the combination and arrangement of parts hereinafter described and claimed.

The invention will be best understood by a reference to the accompanying drawing which forms a part of this specification and in which, Fig. 1 is a central longitudinal central sectional view of the invention.

Fig. 2 is a fragmentary, side elevational view of the invention.

Fig. 3 is a sectional view taken on line 3—3 of Fig. 1.

The invention comprises a cylinder forming casing 7 on the inner surface of which is formed the spiral groove 8. A cap 9 is secured on one end of the casing 7 and projecting through the cap 9 is a filler tube 10 by means of which oil or other suitable liquid may be poured into the casing. A drain tube 11 connects with the interior of the casing 7 at its opposite end. A stud 12 is connected by the arm 13 to the stationary support 14 which in a vehicle would be the axle thereof.

A thrust resisting member in the form of an elongated nut 15 is provided with the spiral peripheral threads 16 which thread into the groove 8. A peripheral bleed groove 17 is formed in the outer surface of each of the threads 16. A rod 18 is slidably projected through the nut 15 and provided at one end with a head 19. Spacing and sealing washers 20 engage between the head 19 and the end of the nut 15. Spacing and sealing washers 21 are held in engagement with the opposite end of the nut 15 by means of the lock nut 22 threaded on the rod 18. This rod 18 slidably projects through the cap 9 and the nut 23 serves to limit the inward thrust of the rod 18. The outer end of the rod 18 is connected by the arm 24 to the movable part 25 with which it is associated, which in the case of a vehicle, would be the body or a connected part thereof.

Lubricant may or may not be used with the invention. When the parts 14 and 25 move to approach or withdraw from each other, a longitudinal thrust will be delivered to the rod 18. Since this rod 18 must carry with it the nut 15, it is evident that the longitudinal thrust delivered to the rod will be translated into a rotary motion on the nut 15 before longitudinal movement of the nut 15 may take place. This method of resistance will afford a durable, easily assembled shock absorber or thrust resistance member, and it is obvious that a variation of the pitch of the threads and the accommodating grooves will determine the thrust resistance offered by the nut. When liquid it used in the chamber 26 of the casing 7, the resistance to longitudinal movement of the nut 15 is further increased and the resistance offered by this liquid will depend upon the capacity or cross sectional area of the groove 17.

It is believed obvious that the assembly and disassembly as well as the mounting of the device is simple and that on account of a minimum number of parts a disarrangement of any of the parts is reduced to a minimum.

While I have illustrated and described the preferred form of construction of my invention, I do not wish to limit myself to the precise details of structure shown, but desire to avail myself of such variations and modifications as may come within the scope of the appended claim.

Having thus described my invention, what I claim as new and desire to secure by Letters Patent is:

A shock absorber of the class described, comprising: a casing having a spiral thread groove formed on its inner surface; a nut having a spiral thread on its periphery engaging in said thread groove, the thread on said nut having a groove formed in its outer surface; a rod projected through said nut and rotatable relatively thereto; a head on one end of said rod, said head being of the same diameter as the body of said nut; a plurality of sealing washers of the same diameter as said head positioned on said rod between said head and one end of said nut; sealing washers positioned on said rod and engaging the opposite end of said nut; a stud secured to and projecting outwardly from one end of said casing, said rod projecting outwardly from the opposite end of said casing; means for connecting said stud to a supporting body; and means for connecting the outer end of said rod to a body movable relatively to said supporting body.

CLARENCE E. LEONARD.